United States Patent [19]

Shibuya

[11] Patent Number: 5,802,595
[45] Date of Patent: Sep. 1, 1998

[54] SERIAL DATA TRANSFER APPARATUS

[75] Inventor: Tadashi Shibuya, Kanagawa, Japan

[73] Assignee: NEC Corporation, Tokyo, Japan

[21] Appl. No.: 777,290

[22] Filed: Dec. 27, 1996

[30] Foreign Application Priority Data

Dec. 27, 1995 [JP] Japan .................................. 7-341642

[51] Int. Cl.$^6$ ......................................... G06F 12/00
[52] U.S. Cl. ............................... 711/167; 395/872
[58] Field of Search .......................... 395/559, 872, 395/874, 878; 711/109, 167, 169

[56] References Cited

U.S. PATENT DOCUMENTS

| | | | |
|---|---|---|---|
| 4,347,582 | 8/1982 | Frank | 395/552 |
| 4,375,676 | 3/1983 | Berkowitz | 711/109 |
| 4,952,367 | 8/1990 | Porter | 395/557 |
| 5,530,901 | 6/1996 | Nitta | 395/848 |
| 5,559,994 | 9/1996 | Ando | 395/494 |
| 5,566,343 | 10/1996 | Nishiguchi | 395/286 |
| 5,644,787 | 7/1997 | Nakamura | 395/853 |

FOREIGN PATENT DOCUMENTS 5-265943  10/1993  Japan .

*Primary Examiner*—Eric Coleman
*Attorney, Agent, or Firm*—Ostrolenk, Faber, Gerb & Soffen, LLP

[57] ABSTRACT

The invention provides a serial data transfer apparatus wherein communication management for serial communication data of a low rate can be executed without an increase in hardware or software scale and such communication management and event management of communication data can be selectively executed. The serial data transfer apparatus includes a control circuit which in turn includes a latch circuit which generates a write control signal to write, each time one communication is completed, a time base count value into a storage region of a reception buffer corresponding to input data. The serial data transfer apparatus further includes a multiplexer which selects, in response to a mode signal supplied thereto, one of a first clock signal and a second clock signal corresponding to the write control signal and supplies the selected clock signal as a count clock signal to a time base counter.

6 Claims, 9 Drawing Sheets

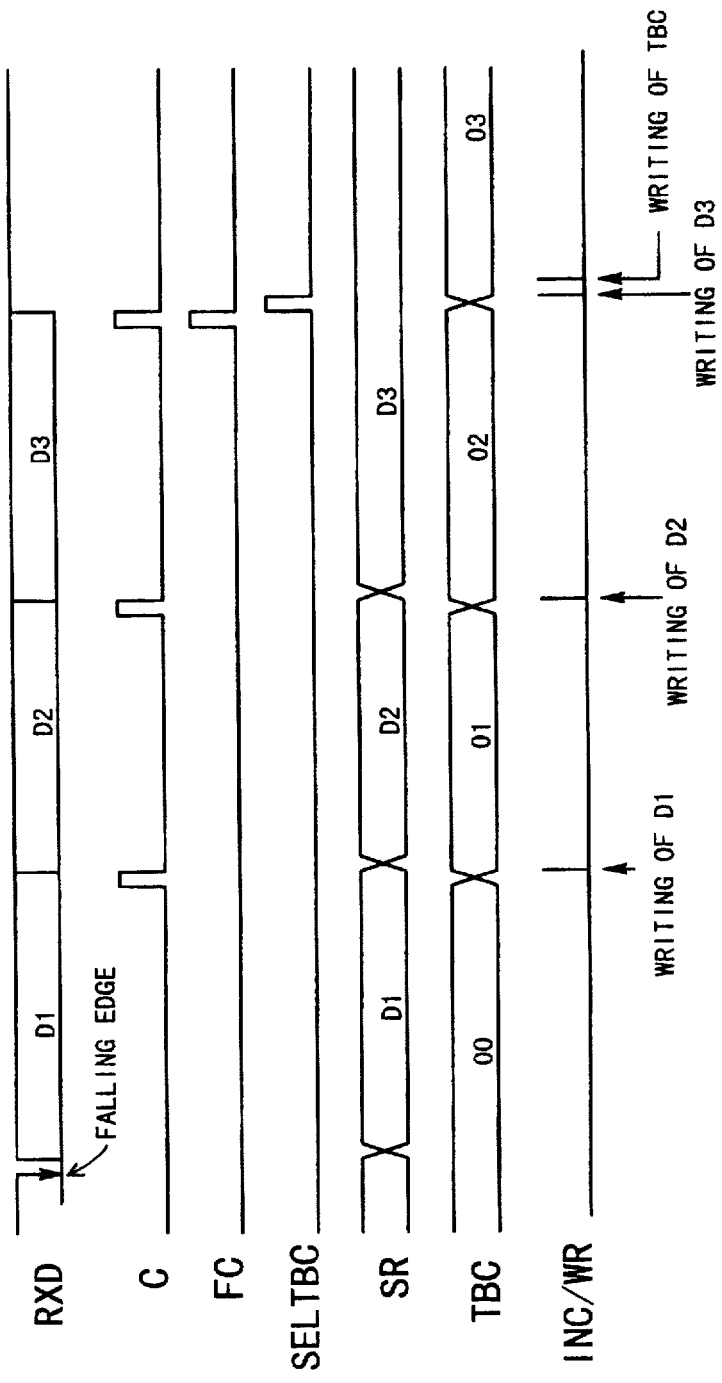

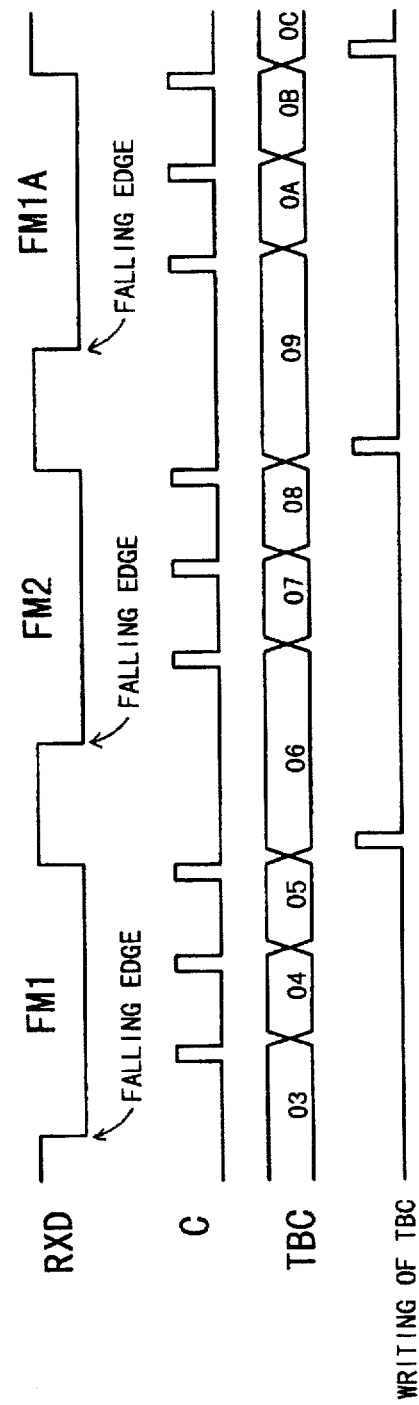

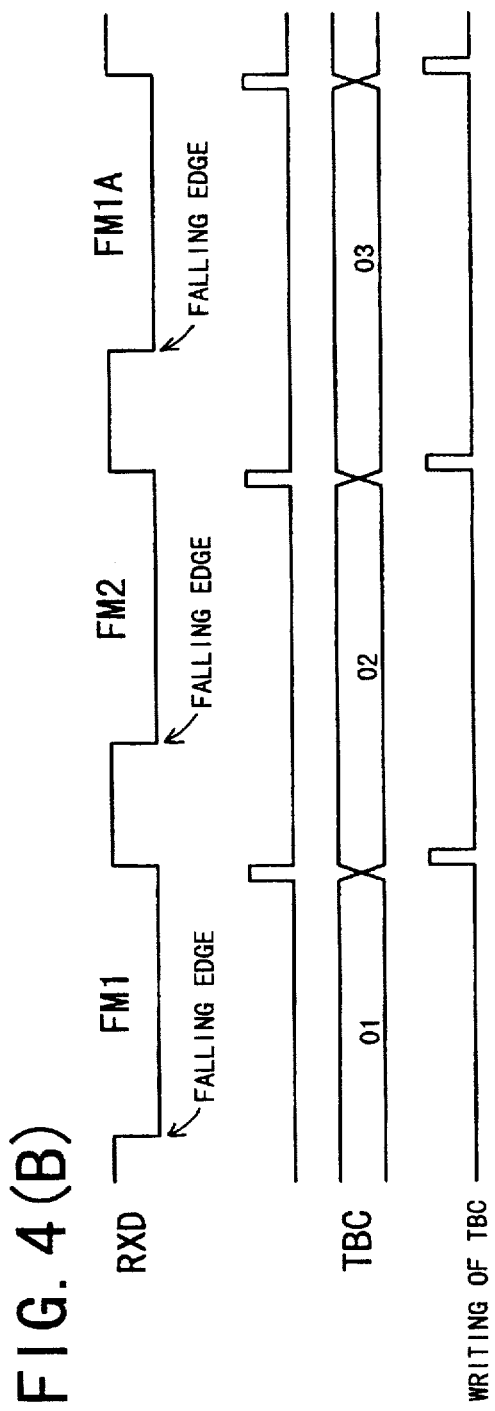

SERIAL DATA TRANSFER APPARATUS

BACKGROUND OF THE INVENTION

1. Field of the Invention

This invention relates to a serial data transfer apparatus, and more particularly to a serial data transfer apparatus built in a microcomputer or a like apparatus.

2. Description of the Related Art

In serial data communication, serial data are transmitted in accordance with a predetermined definition, that is, a protocol. In recent years, among systems which make use of serial data communication, systems called multi-processor systems which include a plurality of microcomputers are increasing. In a system of the type just mentioned, since the entire system must operate in a synchronized condition, data communication is performed frequently and closely between the microcomputers. Generally, in order for a plurality of microcomputers to operate efficiently and closely with each other, the amount of communication of real time data is increased. Here, real time data signifies data which vary with respect to time. Accordingly, time management is required for communication of data.

A serial data transfer apparatus which involves time management is disclosed, for example, in Japanese Patent Application No. Heisei 5-265943, and a reception circuit of the serial data transfer apparatus is shown in FIG. 5. Referring to FIG. 5, the serial data transfer apparatus shown includes a reception buffer 1 for storing communication data, a shift register 2 for receiving and shifting data in synchronism with a shift clock signal SCK, a control circuit 3 for controlling communication, a pointer 4 for designating an address of the reception buffer 1, an input buffer 5 for receiving input data from an RXD terminal and transferring the input data in the inside thereof, a multiplexer 6, a time base counter (TBC) 8 for counting up a time base count value TBC for each fixed period of a clock signal CLK, and a multiplexer 9.

A detailed construction of the control circuit 3 is shown in FIG. 6. Referring to FIG. 6, the control circuit 3 shown includes a falling edge detection circuit 31 for detecting a falling edge of input data received from the input buffer 5 and outputting an edge detection signal E, a bit counter 32 initialized in response to the signal E supplied thereto for counting the number of bits of input data and outputting a carry C each time 8 bits are counted, a frame counter 33 for outputting a carry FC each time the carry C is counted three times, a latch circuit 34 for outputting a TBC selection signal SELTBC and an interrupt request signal INT in response to the carry FC supplied thereto, an AND circuit 35, another AND circuit 36 and an OR circuit 37.

Subsequently, operation of the conventional serial data transfer apparatus will be described with reference to FIGS. 5 and 6. First, it is assumed that, according to the protocol for serial data to be processed, serial data communication is started in response to a falling edge of data. Subsequently to the falling edge, data for 3 frames each including 8 bits are successively transmitted, thereby completing communication for one block. In this instance, the control circuit 3 detects a falling edge of serial data inputted to the RXD terminal and supplied thereto via the input buffer 5 and initializes the communication control, and outputs a CLR (clear) signal for initializing the pointer 4 which designates an address of the reception buffer 1. Then, the shift register 2 performs a shifting operation in synchronism with the shift clock signal SCK to receive the first data D1. Simultaneously, the control circuit 3 calculates the number of bits of the data D1, and, at the last timing at which 8 bits are counted, the control circuit 3 writes the data D1, which are contents of the shift register 2, into the reception buffer 1 via the multiplexer 9 which is conditioned to select the shift register 2 and outputs a pointer signal INC/WR for updating the pointer 4.

The time base count value TBC of the time base counter 8 is counted up for each fixed period of the clock signal CLK. The multiplexer 9 selects the time base counter 8 in response to the TBC selection signal SELTBC outputted from the control circuit 3 and writes the selected output of the time base counter 8 into the reception buffer 1 in response to the pointer signal INC/WR. In this instance, the multiplexer 9 does not select the data D1.

In the control circuit 3, the falling edge detection circuit 31 detects a falling edge of the level of the input data to the RXD terminal supplied thereto from the input buffer 5 and outputs "1" as the detection signal E to initialize the bit counter 32, the frame counter 33 and the latch circuit 34 so that they start their operations subsequently. The bit counter 32 counts up in response to the shift clock signal SCK which represents a communication rate and outputs, each time the count value reaches 8, "1" from the carry C at the last timing of the counting. The frame counter 33 counts up each time the carry C is outputted from the bit counter 32, and outputs, when the count value reaches 3, "1" from the carry FC at the last timing of the counting. The carry FC of the frame counter 33 is supplied to the latch circuit 34 and stops operation of the frame counter 33 and the bit counter 32. The latch circuit 34 outputs, in response to the carry FC supplied thereto, "1" for one period of basic clock signals after the carry FC, from which the TBC selection signal SELTBC and the interrupt request signal INT for a CPU are to be produced, is outputted.

When the carry C of the bit counter 32 is "1" and a clock signal C2 which is one of the basic clock signals is "1", the pointer signal INC/WR outputted from the OR circuit 37 and the AND circuit 36 exhibits "1". Consequently, contents of the pointer 4 are changed and reception data are written from the shift register 2 into the reception buffer 1. Similarly, when the output signal SELTBC of the latch circuit 34 is "1", the signal INC/WR changes to "1" at the timing when the clock signal C2 changes to "1". When the falling edge detection signal E is "1" and the clock signal C2 is "1", the AND circuit 35 outputs a CLR signal of "1" to initialize the pointer 4.

Subsequently, details of operation of the reception circuit of the serial data transfer apparatus will be described with reference to a time chart of FIG. 7. If input data are supplied to the terminal RXD and a falling edge of the input data is detected, then a CLR signal is generated, and in response to the CLR signal, the pointer 4 is initialized and the bit counter 32 and the frame counter 33 start their operations. At the last timing of reception of the first data D1 of 8 bits, a pointer signal INC/WR is outputted, and the data D1 is written from the shift register 2 into an address of the reception buffer 1 designated by the pointer 4. Also the succeeding data D2 and D3 are received in a similar manner and written from the shift register 2 into the reception buffer 1. At the last timing of reception of the data D3, a carry FC of "1" is outputted from the frame counter 33, and then, the output of the latch circuit 34, that is, the TBC selection signal SELTBC, changes to "1" and the interrupt request signal INC/WR changes to "1". Consequently, the time base count value TBC of the time base counter 8 which has counted up in response to the clock signal CLk synchronized with the system is written into an address of the reception buffer 1 following the address in which the data D3 is written.

Since the time base count value TBC at the timing of completion of reception of serial data is written together with reception data into the reception buffer in such a manner as described above, a CPU (not shown) can discriminate the time base count value TBC at the timing of completion of reception.

Upon processing of reception serial data, the CPU reads out a current time base count value TBC and another time base count value TBC stored into the reception buffer 1 upon reception of data using a data bus DB and compares the two time base count values TBC with each other to detect the time difference till the processing point of time of the reception serial data. This allows time management of the reception data.

In a system of this type wherein data are communicated between a plurality of microcomputers, since various serial communication rates are used depending upon the field of application or the operation speed of the microcomputer, time management of serial communication data corresponding to the different communication speeds must be performed.

Generally, for a very high communication rate, time management based on real time data must be performed. Further, not management of time on the real time basis, but also updating management wherein communication is performed prior to transfer of serial communication data and a microcomputer discriminates whether or not the serial communication data are communication data which have been processed or communication data which have not been processed or processing for managing a preferential order of communication data must be performed.

However, with the conventional serial data transfer apparatus described above, since the serial data transfer apparatus is synchronized with the microcomputer system, where time management based on real time data is performed, if the communication rate becomes so low that such a long time as exceeds a time range within which the time base counter can count is required, some countermeasure must be taken. In particular, either the speed of the entire system is lowered or the circuit scale of the counter is increased, or else while the circuit scale of the counter is maintained, the overflow of the counter is managed by software or by some other means.

Where the overflow of the counter is managed by software or the like, also a circuit for discriminating the overflow of the counter and a software counter for starting interrupt processing each time an overflow occurs are required, and this makes an overhead of software.

In summary, the conventional serial data transfer apparatus is disadvantageous in that, since it is synchronized with the system of the microcomputer, where the communication rate is so low that such a long time as exceeds a time range within which the time base counter can count is required, if such countermeasure that either the speed of the entire system is lowered or the circuit scale of the counter is increased or else, while the circuit scale of the counter is maintained, the overflow of the counter is managed by software or by some other means is not provided, then updating management of communication data cannot be performed and also management of the preferential order of communication data cannot be performed.

Further, the conventional serial data transfer apparatus described above is disadvantageous also in that, if the overflow of the time base counter is managed by software or by some other means while the circuit scale of the counter is maintained, then also a circuit for discriminating the overflow of the counter and a software counter for starting interrupt processing each time an overflow occurs are required, and this makes an overhead of software.

SUMMARY OF THE INVENTION

It is an object of the present invention to provide a serial data transfer apparatus wherein communication management for serial communication data of a low rate can be executed without an increase in hardware or software scale and such communication management and event management of communication data can be selectively executed.

In order to attain the object described above, according to the present invention, there is provided a serial data transfer apparatus, comprising storage means for storing communication data wherein one communication includes a predetermined number of frames each including a predetermined number of bits, a shift register for shifting and inputting the communication data to the storage means, a time base counter for counting up a count value in response to a count clock signal supplied thereto and outputting a time base count value, control means for controlling so that the communication data may be communicated for individual bits in accordance with a predetermined procedure, the control means including write control signal generation means for generating a write control signal to write, each time the one communication is completed, the time base count value into a storage region of the storage means corresponding to the communication data, and a selection circuit operable in response to the control signal supplied thereto for selecting one of a first clock signal which is used as a reference for time bases and a second clock signal corresponding to the write control signal and supplying the selected clock signal as the count clock signal to the time base counter.

In the serial data transfer apparatus, since it includes the selection circuit operable in response to the control signal supplied thereto for selecting one of the first clock signal which is used as a reference for time bases and the second clock signal corresponding to the write control signal and supplying the selected clock signal as the count clock signal to the time base counter, the serial data transfer apparatus is advantageous in that, even where the serial communication is performed at such a low speed that, when the time base counter operates in synchronism with the system, the count value exceeds a time range within which the time base counter can count, the serial data transfer apparatus can perform updating management of the communication data and priority order management of the communication data without an increase in scale of the counter circuit or without an overhead of software or the like.

The serial data transfer apparatus is advantageous also in that, if a conventional element which executes communication data time management on the real time basis is used for communication data management by switching its operation from event management, also communication data management similar to conventional communication data management can be performed.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 2(A) and 2(B) are time charts illustrating operation of the serial data transfer apparatus of FIG. 1;

FIGS. 4(A) and 4(B) are time charts illustrating operation of the modified serial data transfer apparatus of FIG. 3;

DESCRIPTION OF THE PREFERRED EMBODIMENT

Figure 1:
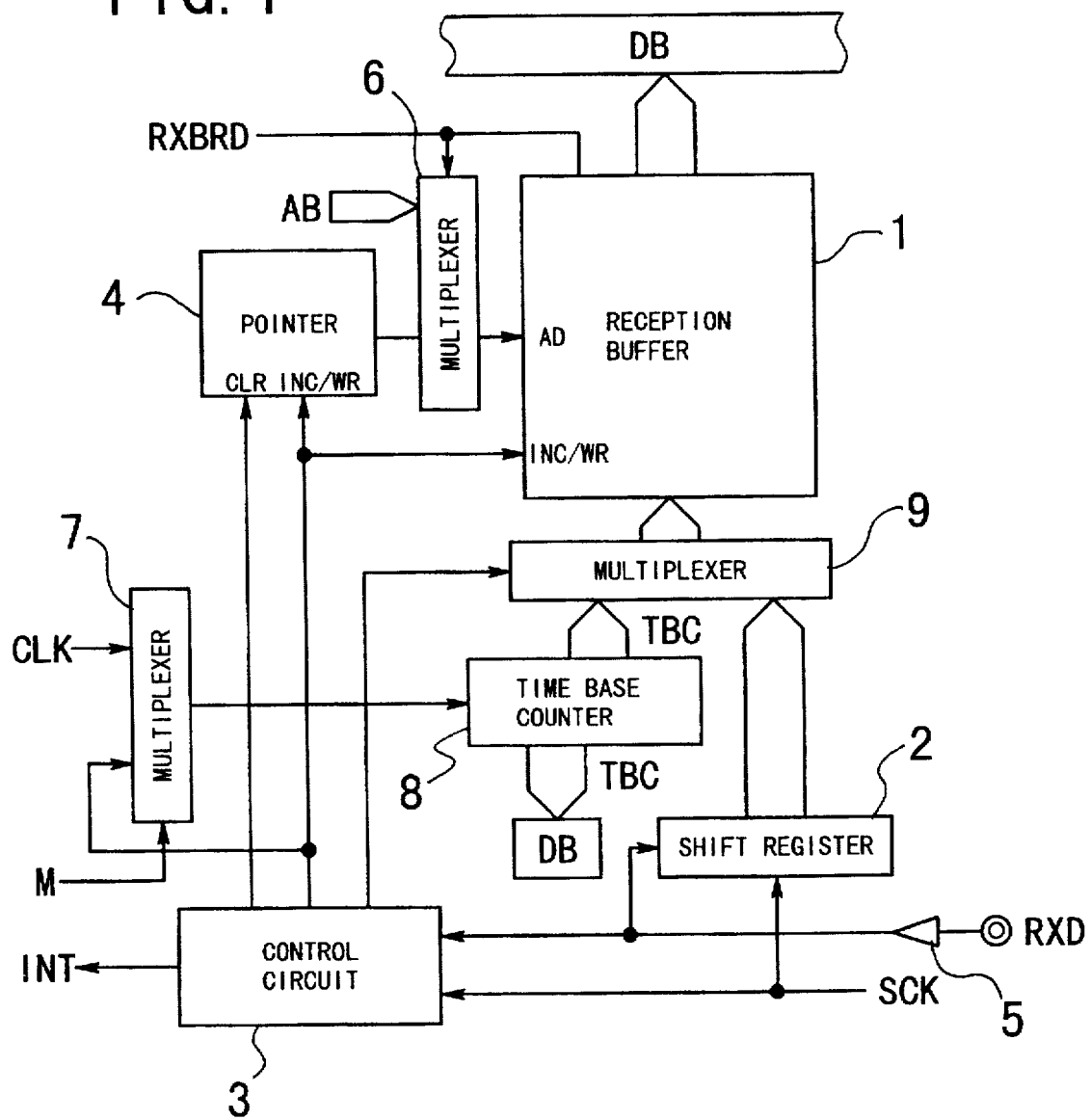
FIG. 1 is a block diagram of a serial data transfer apparatus showing a preferred embodiment of the present invention.
Figure 5:
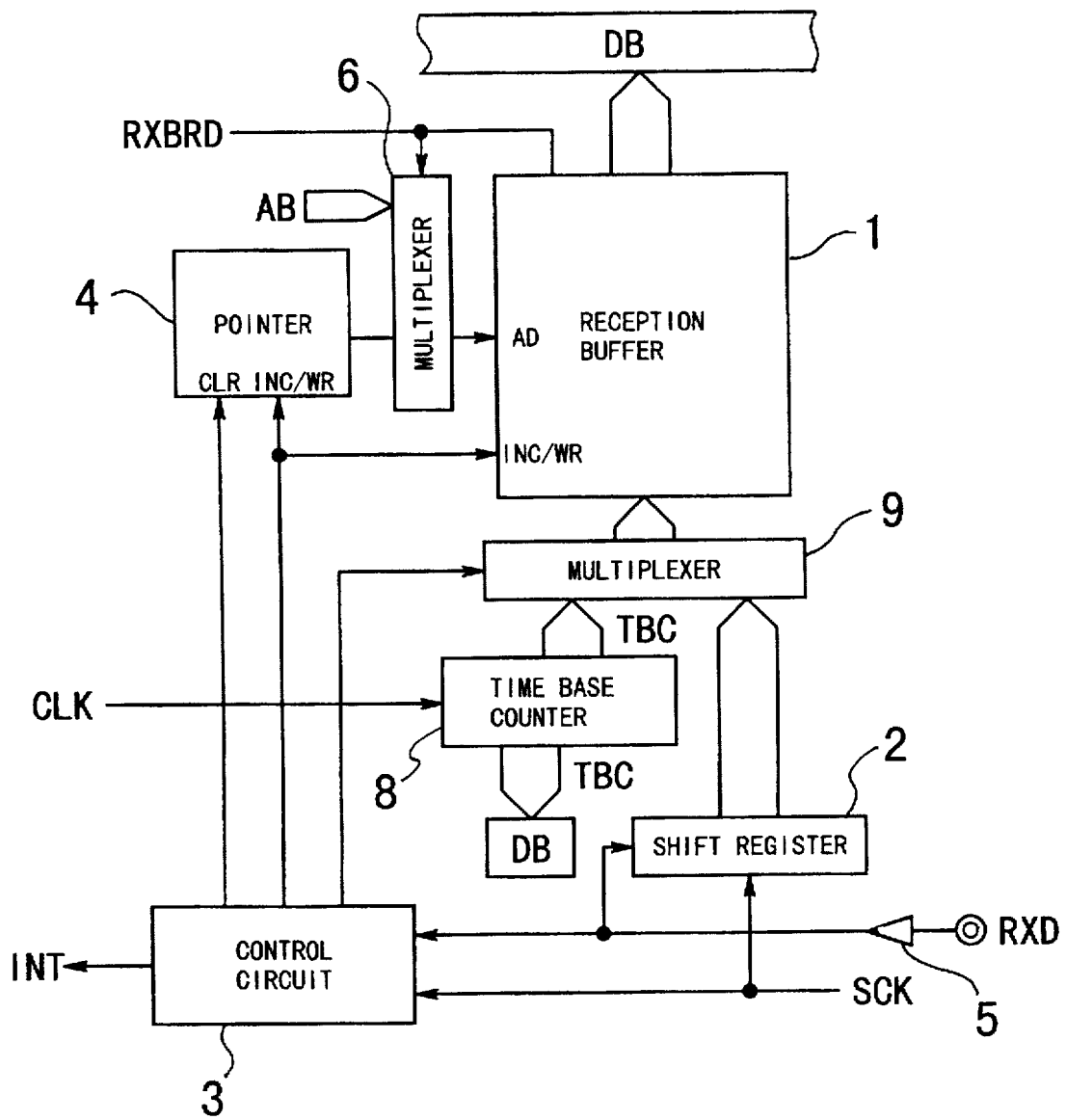
FIG. 5 is a block diagram showing a conventional serial data transfer apparatus.

FIG. 1 shows a serial data transfer apparatus to which the present invention is applied. Referring to FIG. 1, the serial data transfer apparatus shown includes a reception buffer 1, a shift register 2, a control circuit 3, a pointer 4, an input buffer 5, multiplexers 6 and 9, and a time base counter 8 similar to those of the conventional serial data transfer apparatus described hereinabove with reference to FIG. 5. The serial data transfer apparatus additionally includes a multiplexer 7 for selectively supplying a clock signal CLK or a pointer signal INC/WR to the time base counter 8 in response to a mode signal M supplied thereto.

In operation, a procedure in execution of serial communication is similar to that in the conventional serial data transfer apparatus described hereinabove, and serial data are inputted from an RXD terminal. Also the protocol is similar to that of the conventional serial data transfer apparatus, and serial data communication is started in response to a falling edge of data. Subsequently to the falling edge, data of 3 frames each including 8 bits are transferred, thereby completing communication for one block. Communication for one block will be hereinafter referred to as message.

The multiplexer 7 selects a clock signal CLK when a mode signal M set by a microcomputer (not shown) for communication control of the serial data transfer apparatus is "0", but selects a pointer signal INC/WR when the mode signal M is "1", and supplies the selected signal to the time base counter 8. Here, if the mode signal M is "0" and the clock signal CLK is selected, then the serial data transfer apparatus performs similar operation to that of the conventional serial data transfer apparatus described hereinabove. Therefor, description is given here only of the other case wherein the mode signal M is "1" and the signal INC/WR is selected with reference to FIGS. 2(A) and 2(B).

Figure 6:
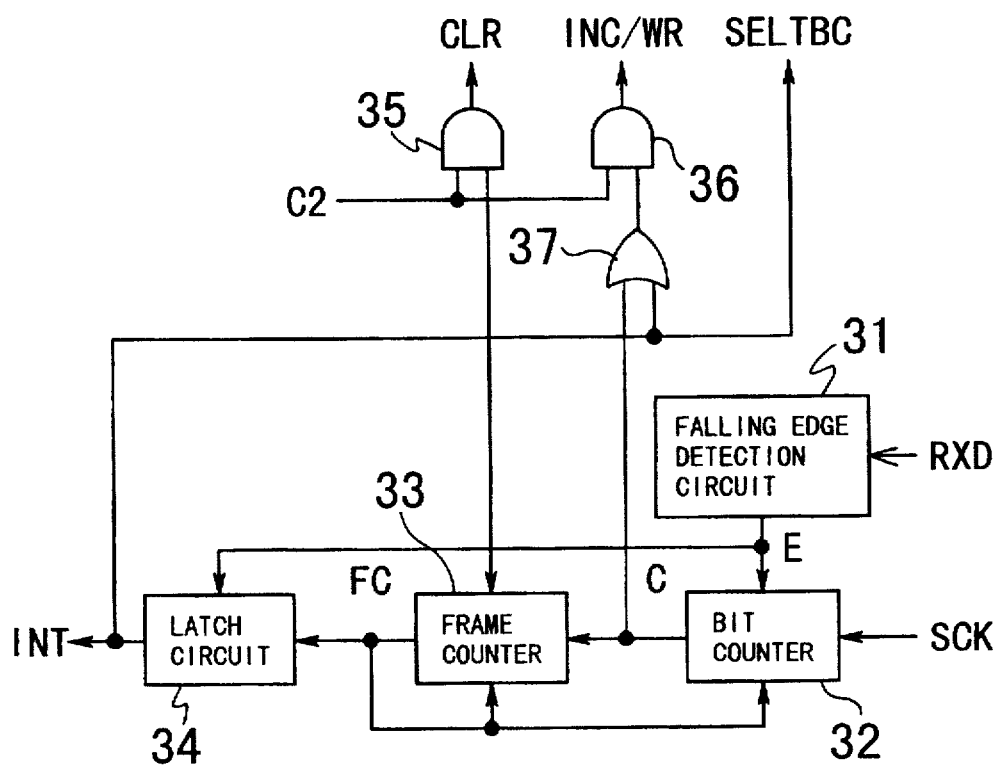
FIG. 6 is a block diagram showing a detailed construction of a control section shown in FIG. 5.
Figure 7:
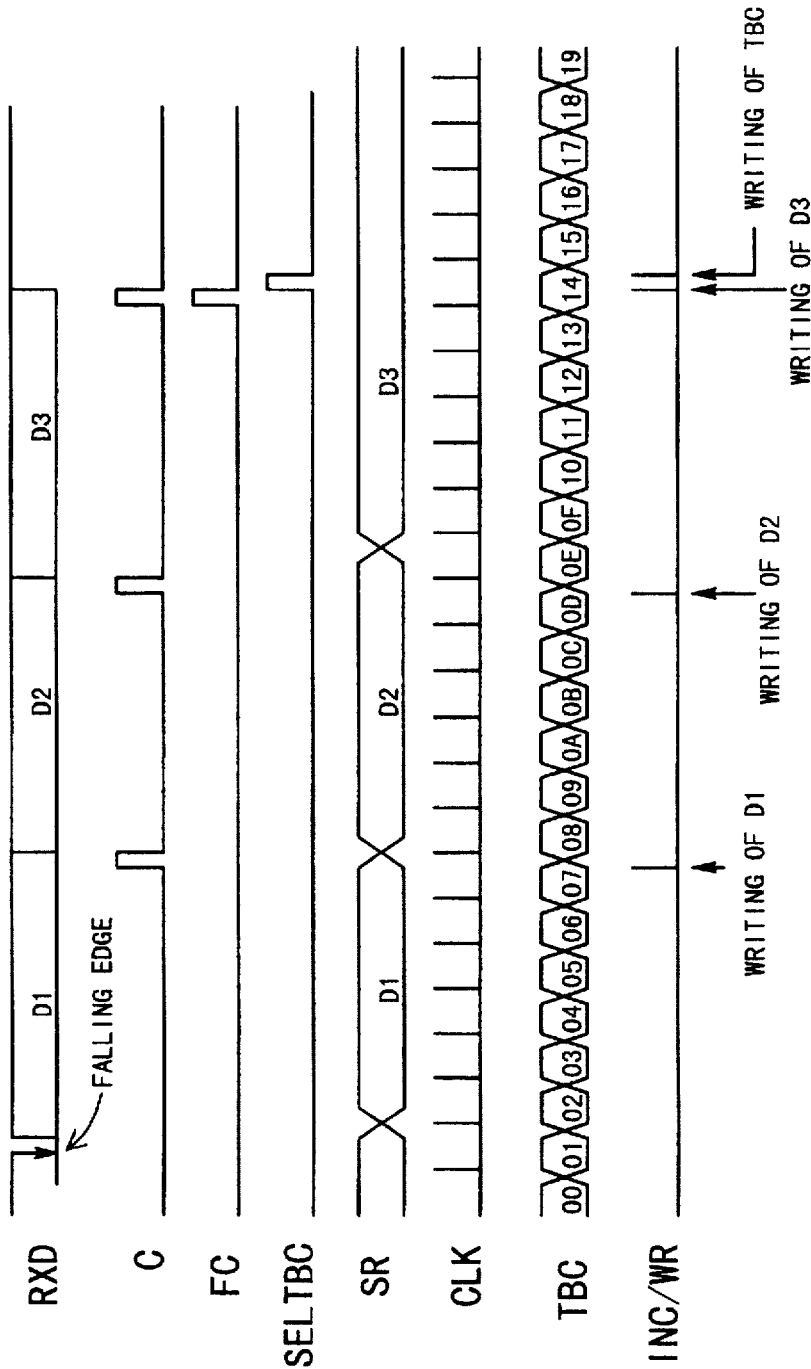
FIG. 7 is a time chart illustrating an example of operation of the conventional serial data transfer apparatus of FIG. 5.

Referring first to FIG. 2(A) which illustrates operation of the serial data transfer apparatus in the form of a time chart and FIG. 6 which shows details of the control circuit 3 also of the serial data transfer apparatus of FIG. 1, if a falling edge is inputted to the terminal RXD, then a CLR signal is generated. Consequently, the pointer 4 is initialized, and the bit counter 32 and the frame counter 33 start their operations. At the last timing of reception of the first 8 bit data D1, a pointer signal INC/WR is outputted, and this data D1 is transferred from the shift register 2 and written into an address of the reception buffer 1 designated by the pointer 4. Further, the pointer signal INC/WR is outputted via the AND circuit 36 to count up the time base count value TBC of the time base counter 8. Also the succeeding data D2 and D3 are transferred to and written into the reception buffer 1 from the shift register 2 and counts up the time base count value TBC. At the last timing of reception of the data D3, the frame counter 33 outputs "1" as a carry FC, and then the latch circuit 34 sets the TBC selection signal SELTBC, which is an output thereof, to "1" to set the pointer signal INC/WR to "1" via the OR circuit 37 and the AND circuit 36. Consequently, the time base count value TBC is transferred to the reception buffer 1 and written into an address of the reception buffer 1 following the address in which the data D3 is written. In other words, the time base count value TBC at each point of time is written for each data for one message.

In this manner, since the time base count value TBC at the timing of completion of reception of serial data is updated for each frame unit of the serial data and the thus updated time base count value TBC is written into the reception buffer 1 together with the reception data, the CPU can know time management data corresponding to the time of completion of reception of serial data in accordance with the serial communication rate independently of the speed of synchronized operation of the microcomputer system.

Referring to FIG. 2(B) which illustrates the processing of the reception serial data by the CPU in the form of a time chart, the CPU reads out, upon processing of reception serial data, the time base count value TBC of the time base counter 8 at present using a data bus DB, and compares the time base count value TBC "06" corresponding to the first communication data received formerly, that is, the message FM1 with the time base count value TBC "0C" corresponding to the message FM1A at present received again after reception of a next message FM2 to detect a difference between the two reception serial data. Consequently, updating management of reception data can be performed.

Figure 3:
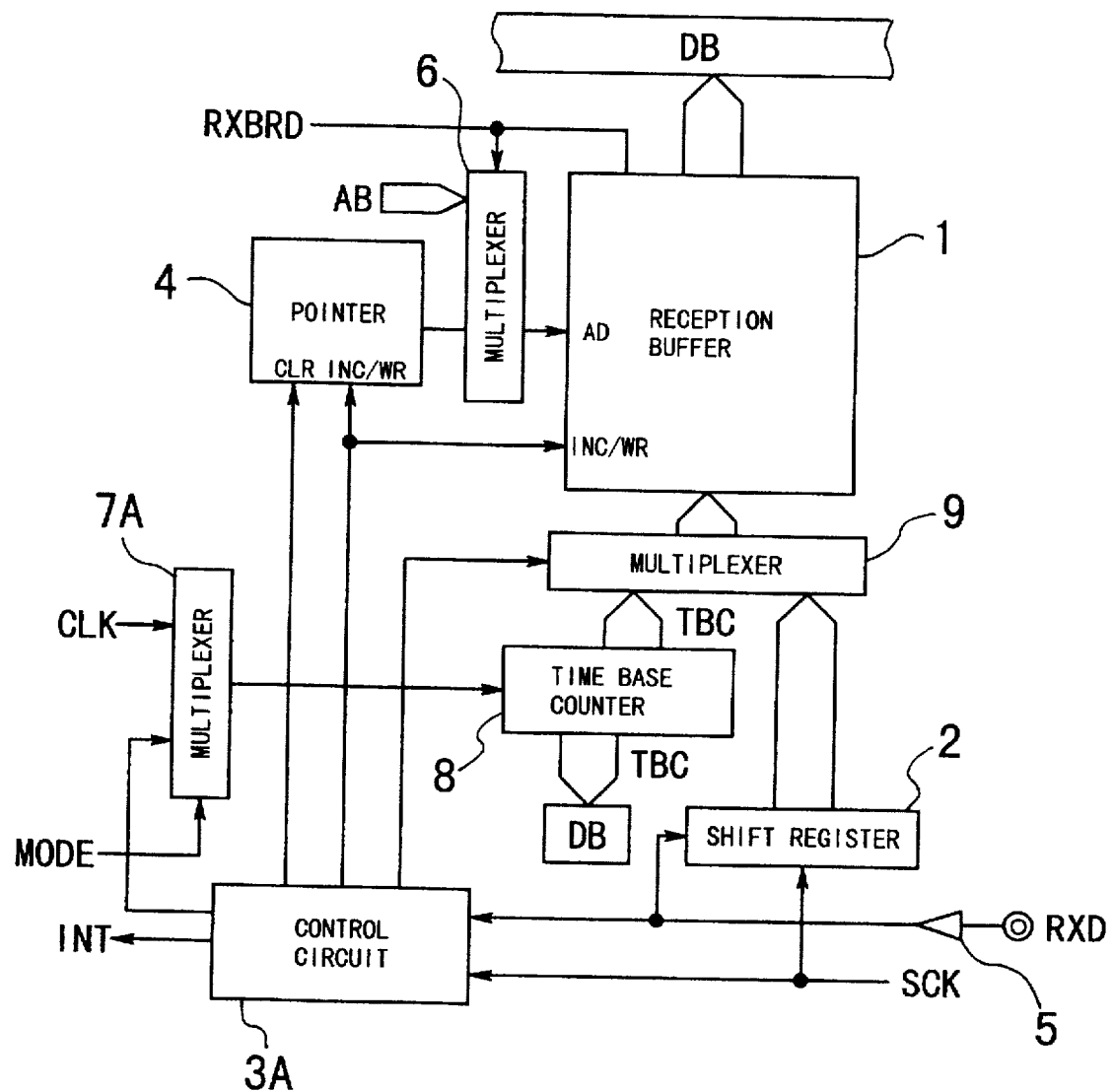
FIG. 3 is a block diagram showing a modification to the serial data transfer apparatus of FIG. 1.

FIG. 3 shows a modification to the serial data transfer apparatus of FIG. 1. Referring to FIG. 3, the modified serial data transfer apparatus shown is different from the serial data transfer apparatus of FIG. 1 in that it includes, in place of the control circuit 3, a control circuit 3A wherein a carry FC outputted from the bit counter 32 is outputted to the outside, and includes, in place of the multiplexer 7, a multiplexer 7A which selectively outputs a clock signal CLK or the carry FC in response to a value of a mode signal M.

Figure 4A:
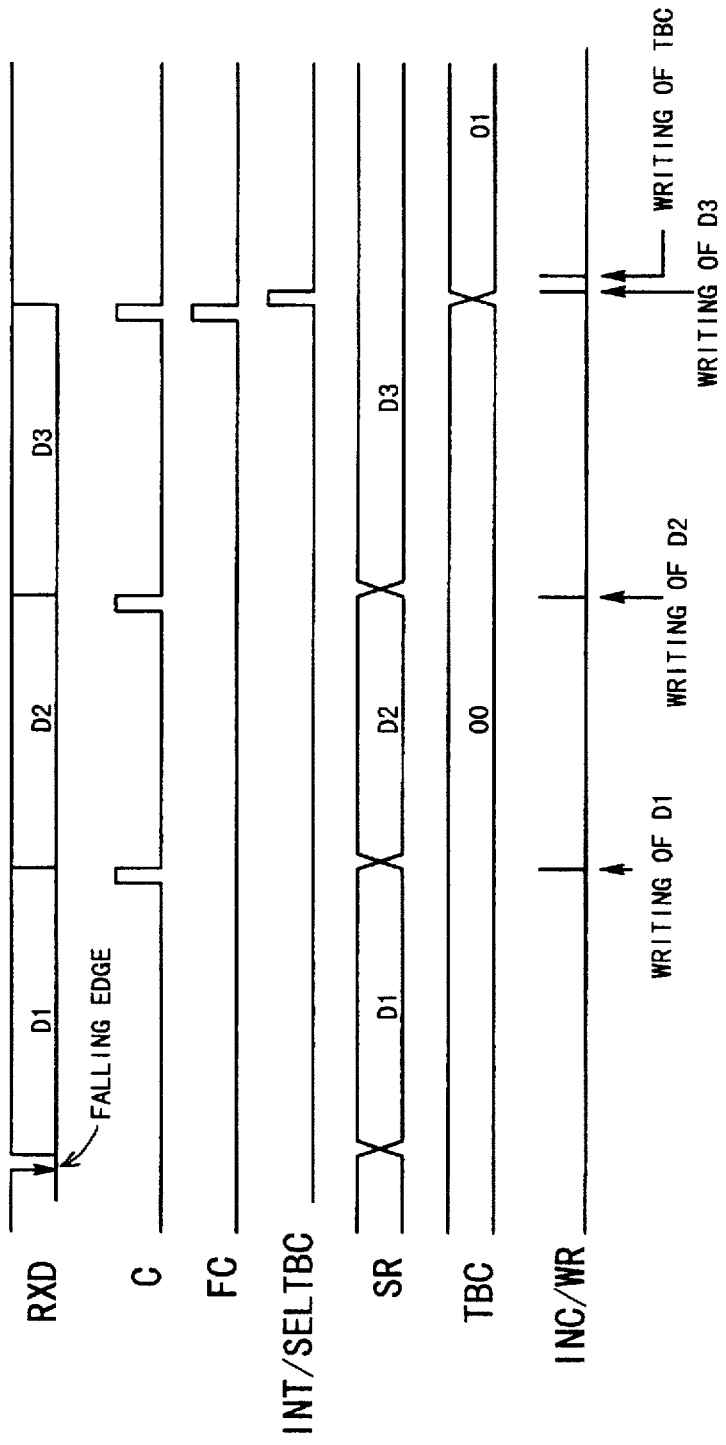

Operation of the modified serial data transfer apparatus will be described below with reference to FIGS. 3 and 4(A). When the mode signal M is "1", the carry FC is selected as a count clock signal for the time base counter 8. At the last timing of reception of the data D1, D2 and D3, the frame counter 33 outputs the carry FC of "1". In response to the value "1" of the carry FC, the time base counter 8 counts up the time base count value TBC thereof and the TBC selection signal SELTBC of the latch circuit 34 at the next stage is changed to "1". Consequently, the pointer signal INC/WR is changed to "1". As a result, the time base count value TBC is written into an address of the reception buffer 1 following the address in which the data D3 is written.

As described above, as the time base count value TBC at the timing of completion of reception of serial data is updated in units of a message of the serial data and the thus updated time base count value TBC is written into the reception buffer together with the reception data, the CPU can known a communication order upon completion of reception of the serial data.

Processing of reception serial data by the CPU will be described with reference to the time chart of FIG. 4(B). The CPU reads out, upon processing of the reception serial data, the time base count value TBC of the time base counter 8 at present using the data bus DB, and compares the time base count value TBC of "01" corresponding to the first message FM1 received formerly with the time base count value TBC of "03" corresponding to the message FM1A received again after reception of the next message FM2 to detect a difference between the two reception serial data. From a result of the detection, the CPU discriminates that the message FM1A corresponding to the time base count value TBC of "03" is a message which has been received later than the other. Consequently, the CPU can perform priority order management of reception data wherein communication data of the message FM1A stored in the reception buffer 1 are recognized as latest data.

Having now fully described the invention, it will be apparent to one of ordinary skill in the art that many changes and modifications can be made thereto without departing from the spirit and scope of the invention as set forth herein.

What is claimed is:

1. A serial data transfer apparatus, comprising:

storage means for storing communication data wherein one communication includes a predetermined number of frames each including a predetermined number of bits;

a shift register for shifting and inputting the communication data to said storage means;

a time base counter for counting up a count value in response to a count clock signal supplied thereto and outputting a time base count value;

control means for controlling so that the communication data may be communicated for individual bits in accordance with a predetermined procedure;

said control means including write control signal generation means for generating a write control signal to write, each time the one communication is completed, the time base count value into a storage region of said storage means corresponding to the communication data; and a selection circuit operable in response to the control signal supplied thereto for selecting one of a first clock signal which is used as a reference for time bases and a second clock signal corresponding to the write control signal and supplying the selected clock signal as the count clock signal to said time base counter.

2. A serial data transfer apparatus as claimed in claim 1, wherein said write control signal generation means includes a bit counter for counting bits of the serial data and generating a frame signal for each predetermined number of bits which makes the frame unit, a frame counter for generating a communication end signal when the number of the frame signals reaches the predetermined number, and a latch circuit for generating the write control signal in response to the communication end signal supplied thereto.

3. A serial data transfer apparatus as claimed in claim 1, wherein the control signal is a mode change-over signal which changes over said time base counter between counting of time bases and counting of events, and the second clock signal is the frame signal.

4. A serial data transfer apparatus as claimed in claim 1, wherein the control signal is a mode change-over signal for changing over said time base counter between counting of time bases and counting of events, and the second clock signal is the communication end signal.

5. A serial data transfer apparatus as claimed in claim 2, wherein the control signal is a mode change-over signal which changes over said time base counter between counting of time bases and counting of events, and the second clock signal is the frame signal.

6. A serial data transfer apparatus as claimed in claim 2, wherein the control signal is a mode change-over signal for changing over said time base counter between counting of time bases and counting of events, and the second clock signal is the communication end signal.

* * * * *